Patented Nov. 1, 1927.

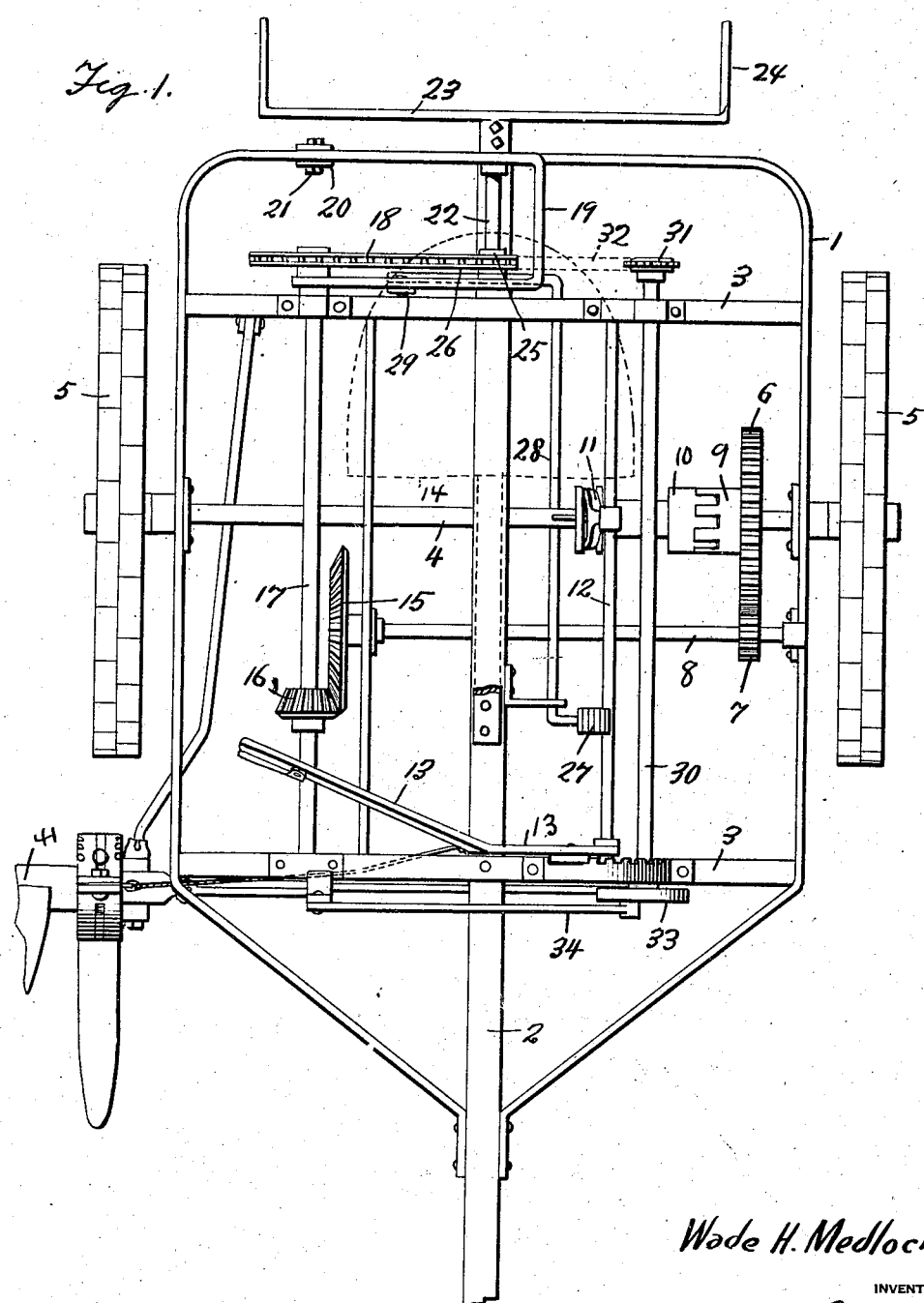

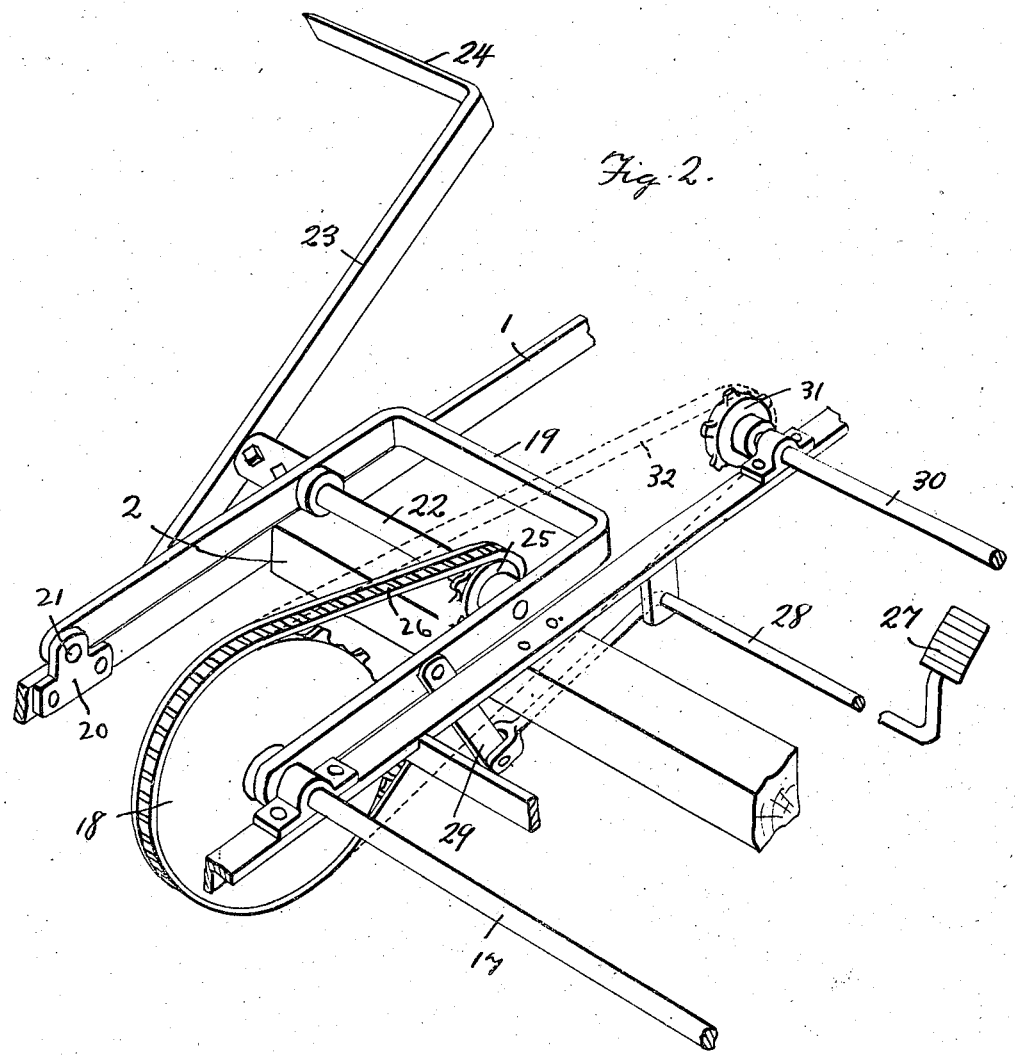

1,647,453

UNITED STATES PATENT OFFICE.

WADE H. MEDLOCK, OF PROVIDENCE, RHODE ISLAND.

STALK CHOPPER.

Application filed October 24, 1925. Serial No. 64,657.

This invention relates to an agricultural implement which is mainly designed for chopping cotton stalks and the like so that such stalks will be knocked down before plowing, the general object of the invention being to provide a wheel supported frame having a sprocket shaft thereon driven from the ground wheels thereof, with means for operating a tool actuating shaft from the first mentioned shaft.

Another object of the invention is to provide foot operated means for lifting the chopper device so that the blades thereof will not engage stumps or other obstacles in the field.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a plan view of the complete device.

Figure 2 is a perspective view showing the means for lifting the chopper attachment by a foot pedal.

In these views, 1 indicates the main frame which is formed of one piece of material. The ends of the piece are fastened to the tongue 2 which extends rearwardly through the frame and is fastened to the cross pieces 3 of the frame. The main shaft is shown at 4 and the ground wheels at 5, these ground wheels being connected with the shaft by the well known ratchet mechanism, not shown. A gear 6 is loosely mounted on the shaft 4 and meshes with a pinion 7 keyed to a cross shaft 8 journaled in the frame. The gear 6 is provided with a clutch part 9 which is adapted to engage a clutch part 10 slidably but non-rotatably connected with the shaft 4, so that when the clutch 10 is in engagement with the part 9, the gear 6 will be caused to move with the shaft 4. The fork 11 for shifting the clutch part 10 is carried by a shaft 12 journaled in the frame and rocked by the hand lever 13 which is so arranged that it can be manipulated by an operator in the seat 14. A bevel gear 15 is fastened to the shaft 8 and meshes with a beveled pinion 16 on a shaft 17 which is journaled in the frame and which has a sprocket wheel 18 detachably connected with its rear end. Thus this sprocket will be rotated from the ground wheels when the clutch part 10 is in engagement with the clutch part 9. A yoke-shaped frame 19 is pivotally connected with the rear part of the main frame by having one limb thereof held on the shaft 17 by the sprocket 18 and the other limb pivotally connected to a bracket 20 on the main frame by the bolt 21. Thus by removing the sprocket 18 and the bolt 21, the frame 19 can be removed from the main frame. A shaft 22 is journaled in the frame 19 and has its rear end extending beyond the main frame and a bar 23 is fastened to this end of the shaft 22. The ends of the bar are bent at right angles, with the opposite edges of each bent part beveled to form knives 24 so that when the shaft is rotated, the knives 24 will rotate in a circular path and thus chop down stalks and the like as the machine travels along. A sprocket 25 is arranged on the shaft 22 and a short chain 26 is adapted to be placed over this sprocket and the sprocket 18 so that the chopper will be rotated from the ground wheels as the machine travels along. When the operator sees a stump or other obstruction in the path of the machine, he can raise the chopper so that it will clear the stump by pressing with his foot on the pedal 27 which is connected with the rod 28, so as to rock the rod and thus raise the frame 19 by means of the link 29 which connects the bent end of the rod with the frame. Thus the knives of the chopper will clear the obstruction and then by removing his foot from the pedal, the frame will drop, so that the knives will again start to chop the stalks in the path of the machine.

As will be understood, the chopper can be stopped by simply rocking the shaft 12 by means of the hand lever 13 to disengage the clutch part 10 from the part 9.

A longitudinally arranged shaft 30 is journaled in the main frame and has a sprocket 31 at its rear end which is adapted to be connected with the sprocket 18 by a long chain 32 when the frame 19 and its attached parts are removed by withdrawing the bolt 21 and removing the sprocket 18 to free the ends of the frame 19 from the main frame. Then the sprocket 18 is put back and connected with the sprocket 31 by the chain 32. Then the shaft 30 will be driven from the ground wheels, provided the clutch part 10 is in engagement with the part 9. A crank disk 33 is connected with the front end of the shaft 30 and a pitman 34 engages the crank thereof and has its other end connected through suitable means with a cutter bar 41 of a mowing machine attachment.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. An agricultural implement comprising a main frame, an axle carried thereby wheels on the axle, a gear loosely mounted on the axle, clutch means connecting the gear with the axle, a transversely arranged shaft journaled in the frame, a pinion thereon meshing with the gear, a longitudinally arranged shaft journaled in the frame, gears connecting the same with the first shaft, a tool actuating shaft journaled in the frame and means for connecting the same with the longitudinal shaft.

2. An agricultural implement comprising a main frame, wheels for supporting the frame, a shaft journaled in the frame, means for driving the shaft from one of the ground wheels, a yoke-shaped frame having one limb pivotally mounted on the shaft, means for pivoting the other limb to the main frame, the pivot being in alignment with the shaft, a shaft carried by the yoke-shaped frame, means for driving the latter shaft by the first shaft and a cutter carried by the shaft of the yoke-shaped frame.

3. An agricultural implement comprising a main frame, wheels for supporting the frame, a shaft journaled in the frame, means for driving the shaft from one of the ground wheels, a yoke-shaped frame having one limb pivotally mounted on the shaft, means for pivoting the other limb to the main frame, the pivot being in alignment with the shaft, a shaft carried by the yoke-shaped frame, means for driving the latter shaft by the first shaft, a cutter carried by the shaft of the yoke-shaped frame, said cutter comprising a bar attached at its center to the shaft and having its ends bent at right-angles, one edge of each bent part being beveled to form a cutting edge.

In testimony whereof I affix my signature.

WADE H. MEDLOCK.